P. GOLDSTEIN.

APPARATUS FOR POINTING AND PUNCHING SHOE LACES.

No. 11,385. Reissued Nov. 14, 1893.

Witnesses:
J. M. Fowler Jr
Franklin Moore

Inventor:
Philip Goldstein
By Hallock and Hallock
Attorneys.

THE NATIONAL LITHOGRAPHING COMPANY,
WASHINGTON, D. C.

UNITED STATES PATENT OFFICE.

PHILIP GOLDSTEIN, OF NEWARK, NEW JERSEY.

APPARATUS FOR POINTING AND PUNCHING SHOE-LACES.

SPECIFICATION forming part of Reissued Letters Patent No. 11,385, dated November 14, 1893.

Original No. 476,999, dated June 14, 1892. Application for reissue filed October 18, 1892. Serial No. 449,297.

*To all whom it may concern:*

Be it known that I, PHILIP GOLDSTEIN, a citizen of the United States, residing at Newark, in the county of Essex and State of New Jersey, have invented certain new and useful Improvements in Apparatus for Pointing and Punching Shoe-Laces, fully described and represented in the following specification and accompanying drawings, forming a part of the same.

The object of this apparatus is to prepare the end of a shoe lace or lacer for applying a wire transversely to form a twisted wire tip. Such preparation consists in cutting the end of the lace obliquely to taper the same and in punching a small hole through the lace at the base of the taper point to insert the transverse wire.

Heretofore, the pointing and punching of leather laces has been done by hand, the operator employing a tool with a knife at one end and a punch at the other and being guided entirely by judgment in the formation of the taper upon the lace.

My device consists, primarily, in a device under which the leather to be cut is placed. This device which I term "a clamp" serves as a guide for placing the leather to be cut and to hold the punched lace in place while the punch is being withdrawn from the leather. The clamp is tapered upon one edge and provided at the opposite edge with a gage-flange and has a hole to admit the punch. The edge of the lace is placed against the gage-flange and the knife passes along the tapered edge of the clamp, thus cutting the point of the lace at a uniform angle, while the punch is inserted through the hole in the clamp, thus punching the lace at a uniform distance from the point.

The device may be used in connection with the hand-tool referred to above, or the knife and punch may be connected to a carrier and guided mechanically in applying them to the lace. Both forms of the apparatus are shown in the annexed drawings, in which—

Figure 3:
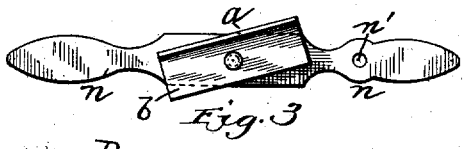
Figure 1:
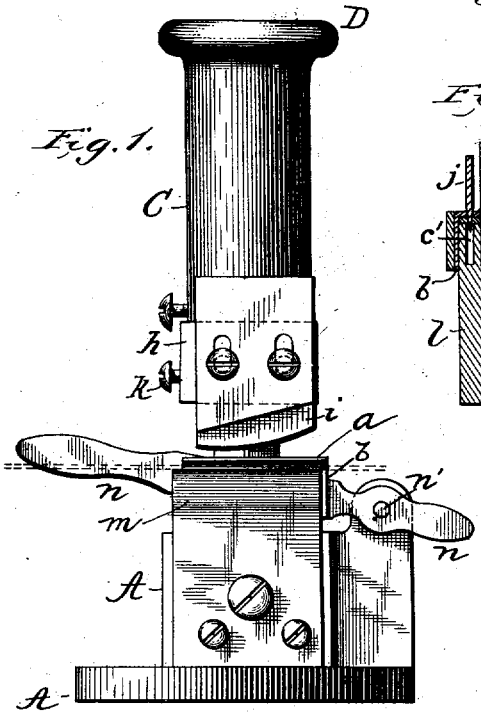
Figure 4:
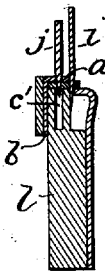
Figure 2:
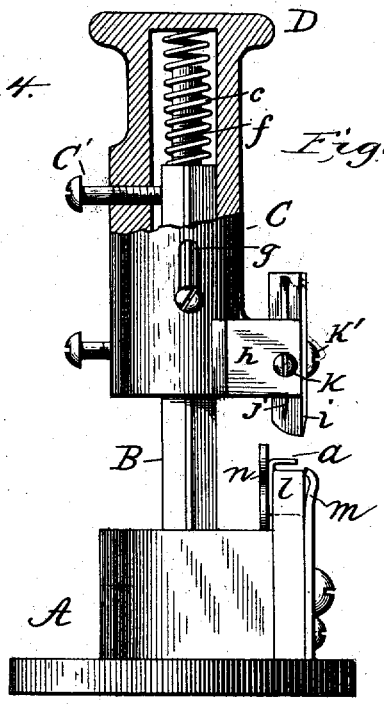
Figure 5:
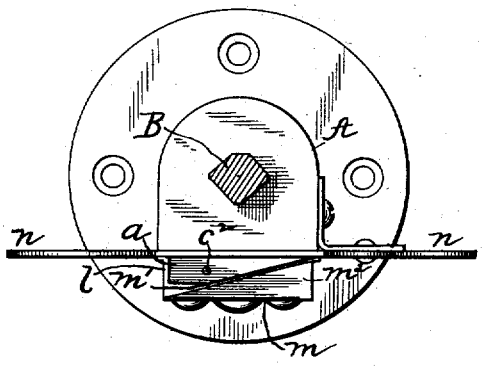

Figure 1 is a front view of a machine having the knife and punch guided mechanically. Fig. 2 is an edge view of the same with the slider in section where hatched. Fig. 3 is a front elevation of the clamp and clamp-lever detached from the machine. Fig. 4 is a vertical section of the knife-bed with the knife and punch in section through the center of the latter. Fig. 5 is a plan of the parts below the line $x\ x$ in Fig. 2; and Fig. 6 is a perspective view of the clamp applied to a lace upon the corner of a table.

Figure 6:
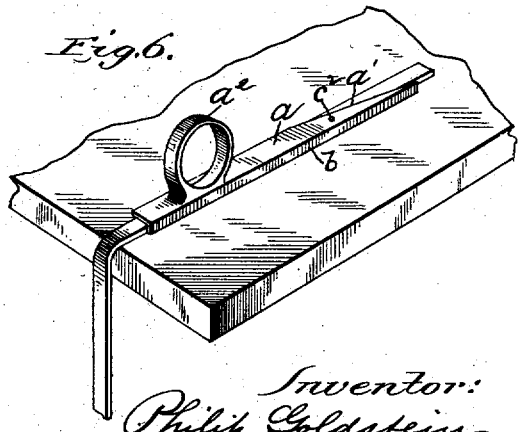

The operation of the clamp will be best understood by reference to the perspective view in Fig. 6, where it is shown applied to a strip of lace-leather $d$ in readiness to cut and punch the same. The clamp consists in a plate $a$, having a gage or flange $b$ along one edge and tapered upon the opposite edge (where it is lettered $a'$) in correspondence with the taper desired upon the shoe-lace. A hole $c$ is formed through the plate at the root of the taper, and the appliance is provided with a ring $a^2$, into which the operator may insert one finger. The lace $d$ is shown laid upon a table E and the clamp pressed thereon, with the gage-flange $b$ in contact with one edge of the lace. In such position the tapered edge $a'$ of the clamp serves as a guide for the knife to trim off the point of the lace, and the hole $c$ serves in like manner as a guide for inserting a punch to pierce the lace at the desired point. The flange $b$, when used in this manner, is made of slight projection below the under side of the clamp, so as to prevent its contact with the table, and thus secure a firm pressure upon the top of the lace. The lace is thus held securely in position and the operator is enabled to trim and pierce the point without any displacement of the leather. When the knife and punch are guided mechanically the clamp is secured to the machine. In both cases the horizontal flange part of the clamp serves as a stripper for the punch when it is desired to remove the latter from engagement with the leather into which it had been inserted through opening $c$. Where the clamp is operated by a lever, as in the machine shown in Fig. 1, the gage $b$ may be made of any depth, as its function is to fit against one edge of the lace, while the knife operates to taper the opposite edge.

The apparatus shown in Figs. 1 and 2 is placed before the operator upon a table in such position that the operator may insert the laces one at a time beneath the clamp and then drive the knife and punch toward the lace by a single blow of the hand upon a sliding carrier, the carrier being retracted by a spring after each blow. The retracting movement of the knife and punch necessitates some means for separating the punch from the leather during that movement, as without such means, the leather would be lifted with the punch and afterward have to be separated therefrom by hand. By interposing the flange between the carrier and the knife bed the leather is stripped from the punch as the latter moves away from the knife bed.

A is the base of the machine, from which a post B is projected upwardly, upon which a slider C is fitted with screws C′ to overcome lost motion. The top of the slider is provided with a cap D to receive the blow of the hand, and a spring *e* is inserted through the top of the post and the cap to press the slider normally upward, the stroke being limited by a screw pin *f* inserted in the post with a slot *g* in the head of the pin to turn it. A projection upon one side of the slider at the bottom forms a carrier *h*, to the front of which the knife *i* is secured, and the punch *j* is inserted through the carrier just behind the knife and secured therein by set-screw *k*. The knife is fixed removably and adjustably upon the front of the carrier by screws *k*′. Upon one side of the base, immediately under the punch, a steel knife-bed *l* is projected upwardly toward the carrier, the plan of the knife-bed being triangular in correspondence with the taper required upon the shoe-lace. The knife is adjusted to slide vertically in contact with the front side of the knife-bed, and a seat-spring *m* is attached to the front of the bed and adjusted to form a narrow slit *m*′ adjacent to the edge of the knife-bed, into which the knife enters in its descent and is pressed toward the bed by the spring, thus securing an effective cutting-contact between the knife and bed. The knife-bed is formed for convenience from a steel bar of rectangular shape, with a portion of the top beveled, as shown in Fig. 5, and the leaf-spring *m* being attached to the lower part of the bed is necessarily bent into a triangular flange $m^2$, flush with the top of the knife-bed to form the slit *m*′. The slit is made of suitable width to admit the edge of the knife, and the knife being tapered upwardly from the edge necessarily crowds the spring outward in its descent, and is in turn pressed by the spring against the face of the knife-bed, as desired.

The top side of the triangular flange $m^2$ is flush with the top of the knife-bed, and thus forms a shoe-lace seat, upon which the shoe-lace rests before it is tapered by the action of the knife. I have termed the spring a "seat-spring" herein, as it thus sustains the lacer, while it also presses the knife toward the knife-bed.

A clamp-lever *n* is pivoted upon the base to move past the inner side of the knife-bed where it projects above the base A, and the flange *b* of the clamp is pivoted to the lever, as shown in Fig. 3, so as to hold the clamp over the bed and raise it from the surface of the bed with the lever to introduce the shoe-lace, as indicated by the dotted lines *d*′ in Fig. 1.

A hole *c*′ is formed in the bed beneath the hole *c* in the clamp to permit the penetration of the punch.

The inclined edges of the clamp and knife-bed are clearly shown in Fig. 5, and the machine is operated by raising the clamp-lever, inserting the lace between the clamp and bed, then pressing the clamp-lever downward and finally striking the slider upon the cap D thus forcing the knife and punch downward and simultaneously cutting and punching the lace, as desired.

By pivoting the clamp upon the clamp lever, as shown in Fig. 1, it is adapted to press uniformly upon laces of different thicknesses when laid upon the bed *l*, and the lace-leather is thus prevented from slipping in the pointing operation.

When pointed and punched the lace is removed from beneath the clamp and another inserted. The action of the apparatus is so simple that an expert operator can taper and punch a great many gross of laces in a working-day.

It will be noticed that the ring attached to the clamps shown in Fig. 6 and the lever attached to the clamp shown in Fig. 3 furnish the necessary means for pressing the clamp upon the shoe-lace during the cutting operation, and other means may be devised, so that I do not limit myself to the particular constructions shown in the drawings. The clamp lever is projected from both sides of its pivot *n*′, and either end may be used to press the clamp upon the shoe-lace or to lift the clamp from the knife-bed, at the convenience of the operator.

Having thus set forth the nature of my invention, what I claim herein is—

1. In a device for pointing and punching shoe laces, a clamp having the hole *c* and provided upon one edge with the flange *b* and tapered upon the opposite edge, substantially as and for the purpose set forth.

2. In a device for pointing and punching shoe-laces, the clamp *a*, having the hole *c* and provided upon one edge with the flange *b* and tapered upon the opposite edge in combination with means for pressing it upon the shoe-lace during the pointing operation, as and for the purpose set forth.

3. The device for pointing and punching shoe-laces, consisting in the clamp *a*, having the hole *c* and provided upon one edge with the flange *b* and tapered upon the opposite edge, in combination with a knife-bed to support the shoe-lace, a lever to actuate the clamp, and a carrier movable to and from the clamp with a knife and punch secured thereon, as and for the purpose set forth.

4. The device for pointing and punching shoe-laces, consisting in the clamp *a*, having the hole *c* and provided upon one edge with the flange $b$ and tapered upon the opposite edge, in combination with a knife-bed to support the shoe-lace, a lever to actuate the clamp, the spring $m$, carrying the shoe-lace seat $m^2$, adjacent to the knife-bed, and a carrier movable to and from the knife-bed with a knife and punch, as and for the purpose set forth.

5. The apparatus for pointing and punching shoe-laces consisting in the base A, post B, knife-bed $l$, and clamp-lever $n$, secured upon the base, with the clamp pivoted upon the lever and projected over the knife-bed, and the slider C, movable upon the post and formed with the carrier $h$, having the knife $i$ and punch secured detachably thereto, the whole arranged and operated substantially as herein set forth.

In testimony whereof I have hereunto affixed my signature in the presence of two witnesses.

PHILIP GOLDSTEIN.

Witnesses:
M. F. HALLECK,
A. E. BENNETT.